(12) United States Patent
Boll

(10) Patent No.: US 12,120,983 B2
(45) Date of Patent: Oct. 22, 2024

(54) WINDROW MERGER FRAME PIVOTABLE TO HEADLAND POSITION

(71) Applicant: CLAAS Saulgau GmbH, Bad Saulgau (DE)

(72) Inventor: Ulrich Boll, Bad Salgau (DE)

(73) Assignee: CLAAS Saulgau GmbH, Bad Saulgau (DE)

( * ) Notice: Subject to any disclaimer, the term of this patent is extended or adjusted under 35 U.S.C. 154(b) by 618 days.

(21) Appl. No.: 17/199,089

(22) Filed: Mar. 11, 2021

(65) Prior Publication Data
US 2021/0282327 A1   Sep. 16, 2021

(30) Foreign Application Priority Data

Mar. 12, 2020   (DE) .......................... 102020106804.2

(51) Int. Cl.
*A01D 80/00*   (2006.01)
*A01D 78/00*   (2006.01)
*A01D 78/14*   (2006.01)

(52) U.S. Cl.
CPC ........... *A01D 80/00* (2013.01); *A01D 78/001* (2013.01); *A01D 78/14* (2013.01)

(58) Field of Classification Search
CPC ....... A01D 78/00–78/20; A01D 89/004; A01B 73/04; A01B 73/078
See application file for complete search history.

(56) References Cited

U.S. PATENT DOCUMENTS

| | | | | |
|---|---|---|---|---|
| 4,379,491 A | * | 4/1983 | Riewerts | A01B 63/22 172/456 |
| 4,606,413 A | * | 8/1986 | Hake | A01B 63/22 280/415.1 |
| 4,793,125 A | * | 12/1988 | Ehrhart | A01D 57/20 56/364 |

(Continued)

FOREIGN PATENT DOCUMENTS

| | | | |
|---|---|---|---|
| EP | 0119659 A2 | 9/1984 | |
| WO | WO-2020222664 A1 | * 11/2020 | ............. A01D 41/02 |

OTHER PUBLICATIONS

European Search Report of Sep. 2, 2021; 8 pages and machine translation.

*Primary Examiner* — Adam J Behrens
*Assistant Examiner* — Madeline I Runco

(57) ABSTRACT

A merger, with a supporting frame having a longitudinal member and crossmembers, with a wheeled chassis, with a drawbar engaging the supporting frame and via which the merger couples to a tractor, with pickup members for picking up crop, wherein one pickup member is accommodated on a first side of the longitudinal member and another pickup member is accommodated on a second side of the longitudinal member, in each case on a crossmember, with belt conveyors for conveying picked-up crop in a transverse conveying direction running transversely with respect to a longitudinal direction, wherein at least one belt conveyor is accommodated on a first side of the longitudinal member and another belt conveyor is accommodated on a second side of the longitudinal member, on the respective crossmember, wherein the drawbar pivots relative to the supporting frame for transferring the merger between a working position to headland or transport position.

12 Claims, 4 Drawing Sheets

(56) References Cited

U.S. PATENT DOCUMENTS

| | | | | |
|---|---|---|---|---|
| 4,905,466 | A * | 3/1990 | Heppner | ............... A01D 57/16 198/813 |
| 7,628,004 | B2 * | 12/2009 | Geiser | ................... A01D 84/00 56/192 |
| 7,681,382 | B2 | 3/2010 | Viaud | |
| 9,538,709 | B2 | 1/2017 | Bassett et al. | |
| 2009/0241503 | A1 * | 10/2009 | Babler | .................. A01D 84/00 56/366 |
| 2015/0327428 | A1 | 11/2015 | Landon et al. | |
| 2020/0288620 | A1 * | 9/2020 | Chwialkowski | ... A01B 63/1006 |

* cited by examiner

WINDROW MERGER FRAME PIVOTABLE TO HEADLAND POSITION

The invention relates to a harvesting apparatus, namely a merger or a pickup swather, according to the preamble of claim 1.

EP 2 979 529 B1 discloses an agricultural harvesting apparatus designed as a merger. Mergers are also referred to as pickup swathers. According to this prior art, the harvesting apparatus designed as a merger has a supporting frame and has a chassis. Furthermore, the harvesting apparatus designed as a merger has pickup members designed as a pickup for picking up harvested crop and transverse conveyor devices designed as belt conveyors for transversely conveying the picked-up harvested crop. The supporting frame has a longitudinal member and has crossmembers, wherein the pickup members and transverse conveying devices are accommodated on the crossmembers. The pickup members and transverse conveyor devices are foldable in order to transfer the harvesting apparatus designed as a merger between a working position and a transport position. The agricultural harvesting apparatus designed as a merger can be coupled to a tractor via a drawbar engaging on the supporting frame.

In the transport position and in what is referred to as a headland position of the harvesting apparatus or of a vehicle and trailer unit consisting of a tractor and the harvesting apparatus, a smaller a turning circle as possible is preferred. To date there have been difficulties in providing such a small turning circle for an agricultural harvesting apparatus designed as a merger.

Taking this as the starting point, the present invention is based on the object of providing a novel harvesting apparatus designed as a merger or pickup swather.

This object is achieved by a harvesting apparatus according to claim 1.

According to the invention, the drawbar is pivotable relative to the supporting frame for transferring the harvesting apparatus between a working position and a headland position and/or a transport position.

Owing to the fact that, in the case of the harvesting apparatus according to the invention designed as a merger, the drawbar is pivotable relative to the supporting frame, a smaller turning circle can be provided in the headland position and/or transport position than in the working position. This can be undertaken with relatively simple means without requiring a complex control system.

According to an advantageous development, the drawbar engages at a first end via a joint on the supporting frame, wherein the drawbar is pivotable relative to the supporting frame about said joint when the harvesting apparatus is transferred between the working position and the headland position and/or transport position. The pivot axis of the drawbar preferably runs perpendicularly to the longitudinal member. This is preferred in order to provide the small turning circle in the headland position and/or transport position with simple means.

According to an advantageous development, at least one actuator for the pivoting movement of the drawbar relative to the supporting frame engages at one end on the supporting frame and at the other end on the drawbar, preferably in such a manner that a first actuator adjacent to a first side of a longitudinal center axis of the longitudinal member and a second actuator adjacent to a second side of the longitudinal center axis of the longitudinal member engages at one end on the longitudinal member of the supporting frame and at the other end on the drawbar.

This permits a particularly advantageous pivoting movement of the drawbar relative to the supporting frame.

According to an advantageous development, the chassis is pivotable relative to the supporting frame for transferring the harvesting apparatus between the working position and the headland position and/or transport position. Preferably, for this purpose, the chassis engages on the supporting frame via a joint, wherein the chassis is pivotable relative to the supporting frame about said joint when the harvesting apparatus is transferred between the working position and the headland position and/or transport position. Whenever also the chassis is pivotable relative to the supporting frame, the turning circle can be reduced even further.

At least one actuator for the pivoting movement of the chassis relative to the on the supporting frame preferably engages at one end on the supporting frame and at the other end on the chassis, in particular in such a manner that the actuator engages in the region of a longitudinal center axis of the longitudinal member at one end on the longitudinal member and at the other end on the chassis.

Preferred developments of the invention emerge from the dependent claims and the description below. Exemplary embodiments of the invention, without being restricted thereto, will be explained in more detail with reference to the drawing, in which:

Figure 1:
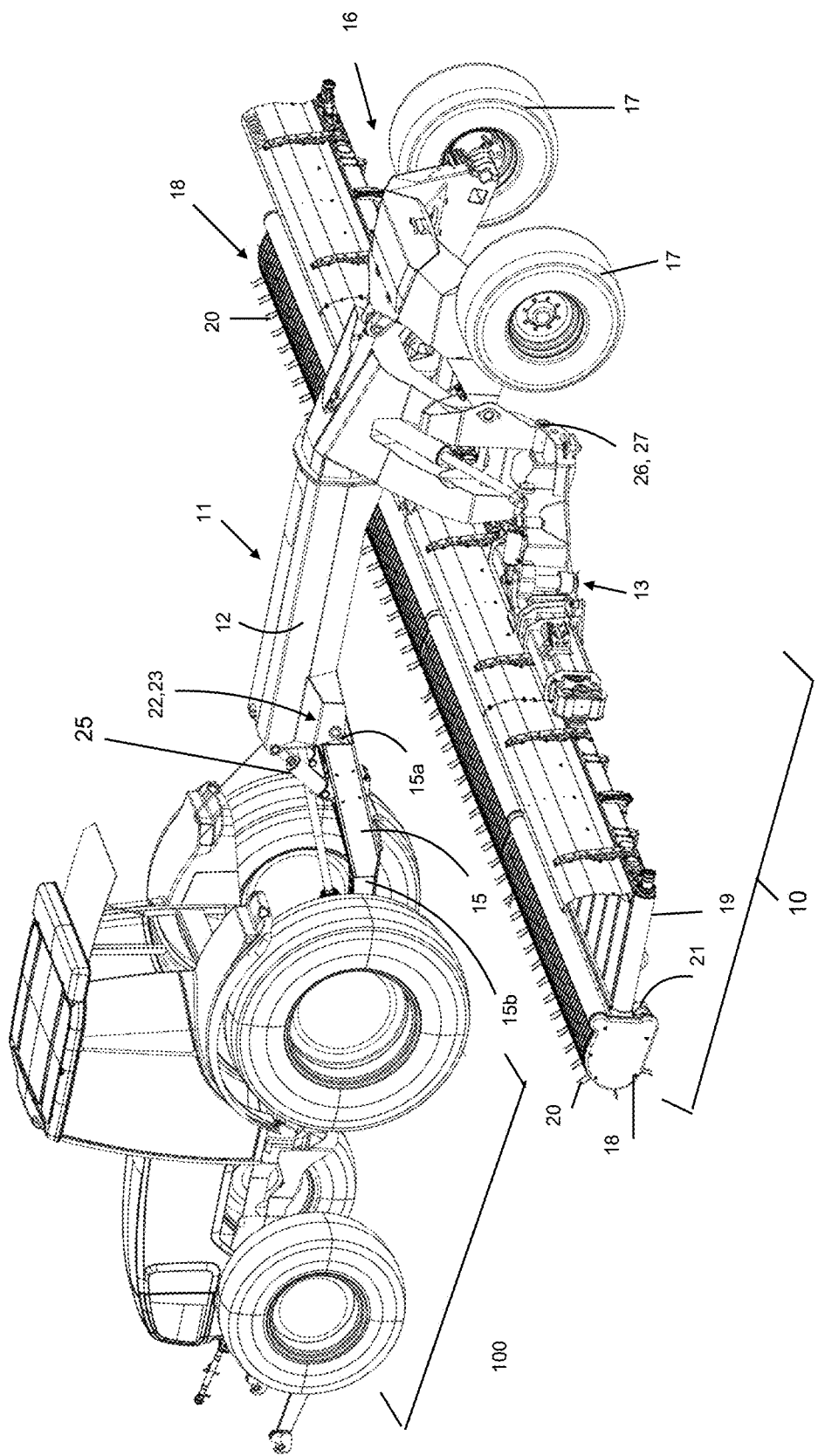
FIG. 1 shows a perspective view from above of a vehicle and trailer unit which comprises a harvesting apparatus designed as a merger or pickup swather and a tractor, in a working position.

The invention relates to a harvesting apparatus designed as a merger. Such a harvesting apparatus is also referred to as a pickup swather.

The harvesting apparatus 10 has a supporting frame 11 with a longitudinal member 12 and crossmembers 13, 14. The harvesting apparatus 10 can be coupled to a tractor 100 via the longitudinal member 12, namely via a drawbar 15 engaging on the front end of the longitudinal member 12, in order to be pulled by the tractor 100 along an underlying surface to be cultivated.

The longitudinal member 12 extends here in the pulling direction or harvesting direction. The crossmembers 13, 14 extend transversely or perpendicularly with respect thereto.

The harvesting apparatus 10 furthermore has a chassis 16 with wheels 17. The chassis 16 is also referred to as the main chassis.

Both in a working position (see FIGS. 1, 2, 3 and 6) and in a transport position (not shown) and also in a headland position (see FIGS. 4 and 5), the harvesting apparatus 10 designed as a merger is supported on an underlying surface to be cultivated or driven over via the wheels 17 of the chassis 16.

The harvesting apparatus 10 furthermore has pickup members 18 and transverse conveyor devices 19.

The pickup members 18 of the harvesting apparatus 10 are designed as what are referred to as pickups and serve for picking up harvested crop from the underlying surface to be cultivated. On a first side of the longitudinal member 12, at least one pickup member 18 is accommodated on the crossmember 13; on a second side of the longitudinal member 12, at least one pickup member 18 is accommodated on the crossmember 14.

The pickup members 18 have pickup tines 20 which are driven about an axis extending in the transverse direction in order to pick up the harvested crop from the ground. In the working position (see FIGS. 1, 2 and 3) of the harvesting apparatus 10, each of the pickup members 18 is supported via feeler wheels 21 on the underlying surface to be cultivated. In a headland position (see FIGS. 4 and 5), the feeler wheels 21 are lifted off from the underlying surface to be cultivated.

As already explained, the harvesting apparatus 10 has the transverse conveyor devices 19 in addition to the pickup members 18.

The transverse conveyor devices 19 of the harvesting apparatus 10 are designed as belt conveyors, wherein the transverse conveyor devices 19 can be used to transport the harvested crop picked up via the pickup members 18 from the underlying surface to be cultivated in a transverse conveying direction extending transversely or perpendicularly with respect to the longitudinal direction.

On the first side of the longitudinal member 12, at least one transverse conveyor device 19 is accommodated on the first crossmember 13, and, on the second side of the longitudinal member 12, at least one further transverse conveyor device 19 is accommodated on the second crossmember 14, wherein both of said transverse conveyor devices 19 are designed as belt conveyors.

As can be gathered from the drawings, the transverse conveyor devices 19 are arranged downstream of the pickup members 18, as seen in the harvesting direction or pulling direction of the harvesting apparatus.

The drawbar 15 is pivotable relative to the supporting frame 11, specifically for transferring the harvesting apparatus 10 between a working position and a headland position and/or for transferring the harvesting apparatus between the working position and/or a transport position.

The drawbar 15 thus engages at a first end 15a via a joint 22, which defines a pivot axis 23, on the supporting frame 11, namely on the longitudinal member 12 of the supporting frame 11, in an articulated manner. The drawbar 15 is pivotable relative to the supporting frame 11, specifically relative to the longitudinal member 12 of the supporting frame 11, about said joint 22, and therefore about the pivot axis 23 provided by the joint 22, when the harvesting apparatus 10 is transferred between the working position and the headland position and/or the transport position. Said pivot axis 23 runs approximately horizontally in the transverse direction and therefore perpendicularly to the longitudinal member 12.

The harvesting apparatus 10 can be coupled to the harvesting vehicle 100 via a second end 15b of the drawbar 15. At said second end 15b, a hitch device 24 is formed via which the harvesting apparatus 10 is ultimately joined to the tractor 100. In the exemplary embodiment shown, said hitch device 24 is designed here as a ball-type hitch device, specifically in such a manner that a ball socket fastened to the second end 15b of the drawbar 15 can be coupled to a corresponding ball of the tractor 100. As an alternative to such a ball-type hitch device, there can also be a lower-link hitch device.

In order to provide the pivoting movement between the drawbar 15 and the supporting frame 11, use is made of at least one actuator 25 which engages at one end on the drawbar 15 and at the other end on the supporting frame 11.

Figure 6:
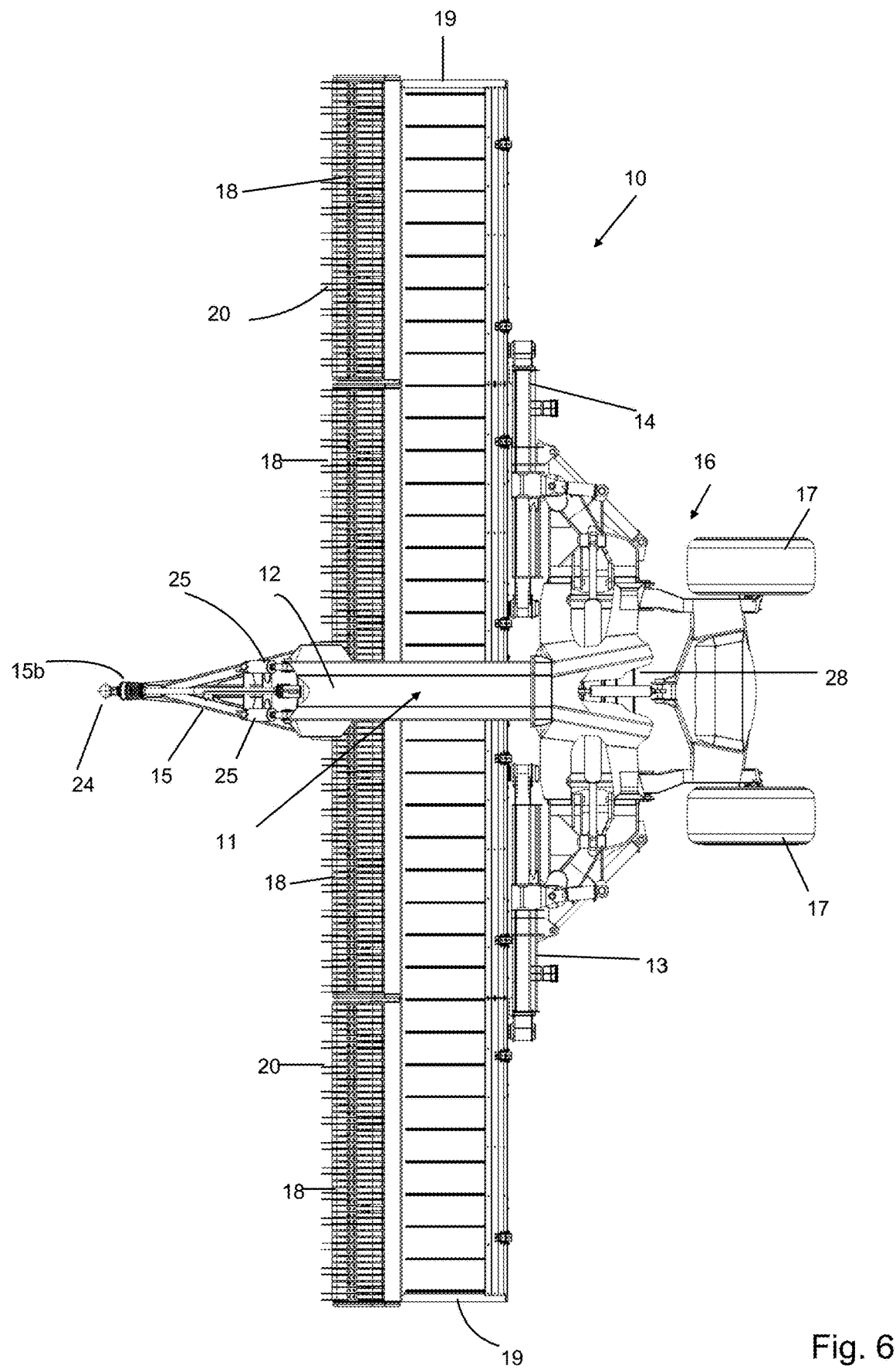
FIG. 6 shows the harvesting apparatus in an illustration on its own in a top view of the working position.

As can be gathered best from FIG. 6, for the pivoting movement of the drawbar 15 relative to the supporting frame 11, a first actuator 25 on a first side of a longitudinal center axis of the longitudinal member 12 and a second actuator 25 adjacent to a second side of the longitudinal center axis of the longitudinal member 12 engage at one end on the longitudinal member 12 of the supporting frame 11 and at the other end on the drawbar 15. By this means, a particularly advantageous pivoting movement between the drawbar 15 and the supporting frame 11 can be ensured.

Figure 2:
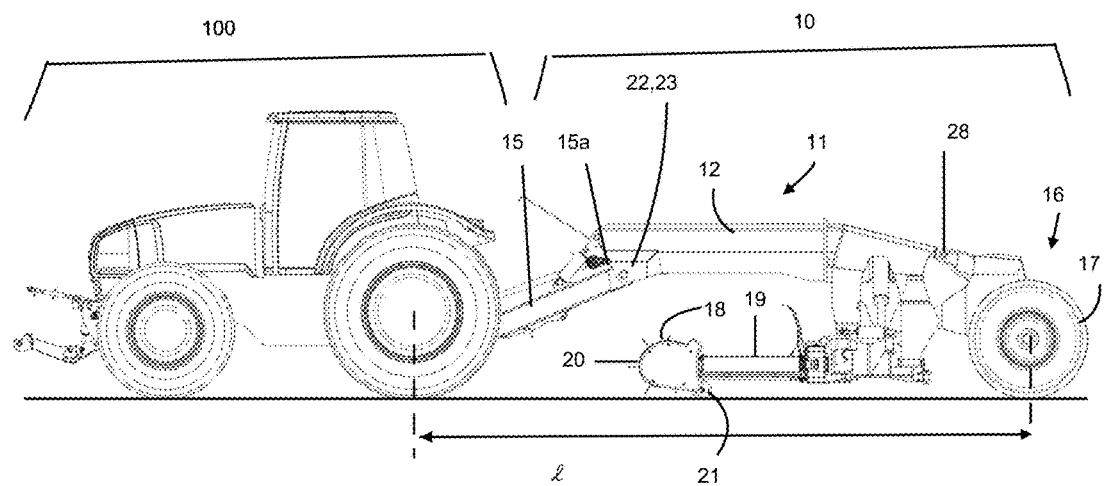
FIG. 2 shows the vehicle and trailer unit of FIG. 1 in a side view in a side view of the working position.
Figure 3:
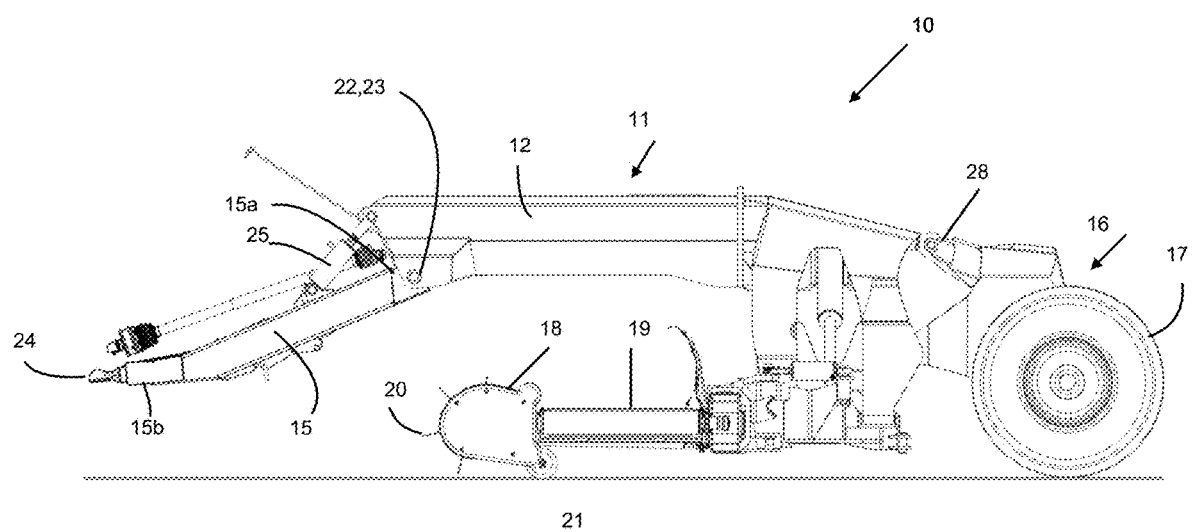
FIG. 3 shows the harvesting apparatus in an illustration on its own in a side view of the working position.
Figure 4:
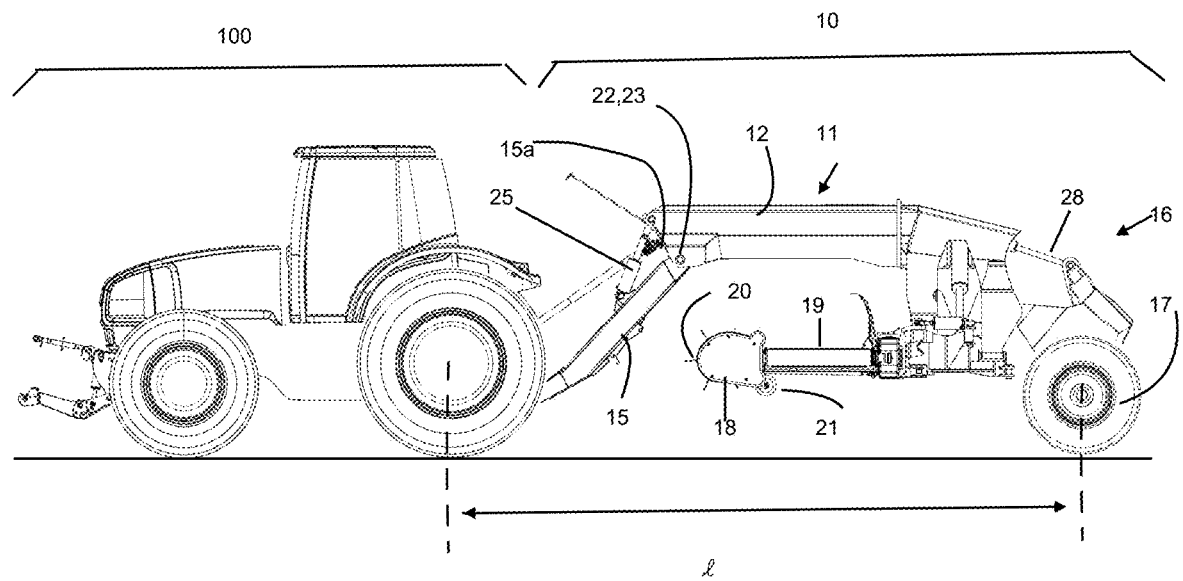
FIG. 4 shows the vehicle and trailer unit of FIG. 2 in a side view in a side view of the headland position.
Figure 5:
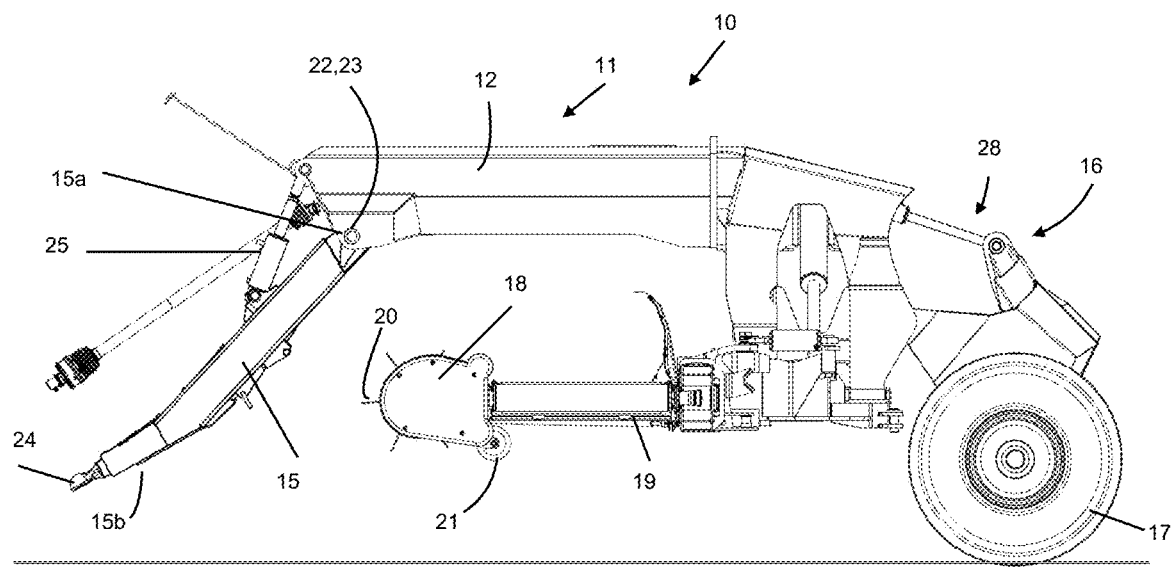
FIG. 5 shows the harvesting apparatus in an illustration on its own in a side view of the headland position.

When the harvesting apparatus 10 is transferred from the working position shown in FIGS. 2 and 3 into the headland position shown in FIGS. 4 and 5, the drawbar 15 is pivoted upward, as a result of which the longitudinal member 12 of the supporting frame 11 is shifted upward and forward. In the process, a length I between a rear axle of the tractor 100 and an axle of the wheels 17 of the chassis 16 of the harvesting apparatus 10 is then reduced, as a result of which a smaller turning circle can be ensured in the headland position.

According to an advantageous development of the invention, also the chassis 16 of the harvesting apparatus 10 is pivotable relative to the supporting frame 11 for transferring the harvesting apparatus between the working position and the headland position and/or the transport position. The chassis 16 is thus fastened pivotably to the supporting frame 11 via a joint 26 which provides a pivot axis 27 (see FIG. 1). When the harvesting apparatus 10 is transferred between the working position and the headland position and/or transport position, the chassis 16 is pivotable relative to the supporting frame 11 about said joint 26 and therefore about the pivot axis 27 provided by the joint 26, wherein said pivot axis 27 in turn runs in the transverse direction and thus perpendicularly to the longitudinal member 12.

In order to shift the chassis 16 relative to the supporting frame 11, use is made in turn of an actuator 28 which engages at one end on the supporting frame 11 and at the other end on the chassis 16.

As can be gathered from FIG. 6, for the pivoting movement of the chassis 16 relative to the supporting frame 11, said actuator 28 engages in the region of the longitudinal center axis of the longitudinal member 12 at one end on the longitudinal member 12 and at the other end on the chassis 16.

Said shifting of the chassis 16 relative to the supporting frame 11 when the harvesting apparatus 10 is transferred into the headland position or transport position makes it possible to further reduce the length I between the rear axle of the tractor 100 and the axle of the wheels 17 of the chassis 16 of the harvesting apparatus 10, and thus the turning circle.

The actuators 25, 28 of the drawbar 15 and of the chassis 16 can optionally be activated independently of one another or simultaneously. It is also possible to activate the actuators 25, 28 with a time delay. Particularly advantageously, the actuators 25, 28 of the drawbar 15 and of the chassis 16 can be activated or adjusted in coordination with one another in such a manner that the harvesting apparatus 10 can be ideally adapted to the respective harvesting conditions. By means of a corresponding coordination of the pivoting position of the drawbar 15 with the pivoting position of the chassis 16, the inclination of the harvesting apparatus 10, as seen in the direction of travel, can be changed. In particular by changing the inclination of the transverse conveyor device 19, the transfer of the harvested crop from a pickup member 18 onto the conveyor belt can be improved. During harvesting of travel on a slope, the actuator 28 of the chassis 16 could be activated in such a manner that the longitudinal member 12 is raised at the rear such that the harvesting apparatus 10, and thus in particular the transverse conveyor device 19, is oriented more horizontally, and therefore the harvested crop is distributed more uniformly on the conveyor belt and the conveyor capacity is improved.

The actuators 25, 28 are preferably hydraulic cylinders and accordingly hydraulic actuators.

The shifting movement between the supporting frame 11 and the drawbar 15 and the shifting movement between the supporting frame 11 and the chassis 16 can be damped via dampers.

With the invention, it is not only possible to provide a smaller turning circle in the headland position and transport position, but also more lift for the pickup members 18 can also be ensured.

LIST OF REFERENCE SIGNS

10 Harvesting apparatus
11 Supporting frame
12 Longitudinal member
13 Crossmember
14 Crossmember
15 Drawbar
15a End
15b End
16 Chassis
17 Wheel
18 Pickup member
19 Transverse conveying device
20 Pickup tines
21 Feeler wheel
22 Joint
23 Pivot axis
24 Hitch device
25 Actuator
26 Joint
27 Pivot axis
28 Actuator
100 Tractor

The invention claimed is:

1. A harvesting apparatus, namely merger or pickup swather,
    with a supporting frame (11) having a longitudinal member (12) and crossmembers (13, 14),
    with a chassis (16) having wheels (17),
    with a drawbar (15) which engages on the supporting frame (11) and via which the harvesting apparatus can be coupled to a tractor,
    with pickup members (18) designed as a pickup for picking up harvested crop, wherein at least one pickup member (18) is accommodated on a first side of the longitudinal member (12) and at least one further pickup member (18) is accommodated on a second side of the longitudinal member (12), in each case on a crossmember (13, 14),
    with transverse conveyor devices (19) designed as belt conveyors for conveying the picked-up harvested crop in a transverse conveying direction running transversely with respect to a longitudinal direction, wherein at least one transverse conveyor device (19) is accommodated on a first side of the longitudinal member (12) and at least one further transverse conveyor device (19) is accommodated on a second side of the longitudinal member (12), on the respective crossmember (13, 14), characterized in that the drawbar (15) and the chassis (16) are pivotable relative to the supporting frame (11) for transferring the harvesting apparatus between a working position and a headland position and/or a transport position; and
an actuator (28) for the pivoting movement of the chassis (16) relative to the supporting frame (11) engages in the region of a longitudinal center axis of the longitudinal member (12) of the supporting frame (11) at one end on the longitudinal member (12) of the supporting frame (11) and at the other end on the chassis (16).

2. The harvesting apparatus according to claim 1, characterized in that the drawbar (15) engages at a first end (15a) via a joint (22) on the supporting frame (11), wherein the drawbar (15) is pivotable relative to the supporting frame (11) about the joint (22) when the harvesting apparatus is transferred between the working position and the headland position and/or transport position.

3. The harvesting apparatus according to claim 1, characterized in that a pivot axis (23) of the drawbar (15) runs in an approximately horizontal direction perpendicularly to the longitudinal member (12) of the supporting frame (11).

4. The harvesting apparatus according to claim 1, characterized in that at least one actuator (25) for the pivoting movement of the drawbar (15) relative to the supporting frame (11) engages at one end on the supporting frame (11) and at the other end on the drawbar (15).

5. The harvesting apparatus according to claim 4, characterized in that a first actuator (25) adjacent to a first side of a longitudinal center axis of the longitudinal member (12) of the supporting frame (11) and a second actuator (25) adjacent to a second side of the longitudinal center axis of the longitudinal member (12) of the supporting frame (11) engages at one end on the longitudinal member (12) of the supporting frame (11) and at the other end on the drawbar (15).

6. The harvesting apparatus according to claim 1, characterized in that the drawbar (15) can be coupled at a second end (15b) to the harvesting vehicle via a hitch device (24).

7. The harvesting apparatus according to claim 6, characterized in that the hitch device (24) is a lower-link hitch device or a ball-type hitch device.

8. The harvesting apparatus according to claim 1, characterized in that the chassis (16) is pivotable relative to the supporting frame (11) for transferring the harvesting apparatus between the working position and the headland position and/or transport position.

9. The harvesting apparatus according to claim 8, characterized in that the chassis (16) engages on the supporting frame (22) via a joint (26), wherein the chassis (16) is pivotable relative to the supporting frame (22) about the joint (26) when the harvesting apparatus is transferred between the working position and the headland position and/or transport position.

10. The harvesting apparatus according to claim 8, characterized in that a pivot axis (27) of the chassis (16) runs perpendicularly to the longitudinal member (12) of the supporting frame (11).

11. A harvesting apparatus, namely merger or pickup swather,
    with a supporting frame (11) having a longitudinal member (12) and crossmembers (13, 14),
    with a chassis (16) having wheels (17),
    with a drawbar (15) which engages on the supporting frame (11) and via which the harvesting apparatus can be coupled to a tractor,
    with pickup members (18) designed as a pickup for picking up harvested crop, wherein at least one pickup member (18) is accommodated on a first side of the longitudinal member (12) and at least one further pickup member (18) is accommodated on a second side of the longitudinal member (12), in each case on a crossmember (13, 14), with transverse conveyor devices (19) designed as belt conveyors for conveying the picked-up harvested crop in a transverse conveying direction running transversely with respect to a longitudinal direction, wherein at least one transverse conveyor device (19) is accommodated on a first side of the longitudinal member (12) and at least one further transverse conveyor device (19) is accommodated on a second side of the longitudinal member (12) on the respective crossmember (13, 14), characterized in that the drawbar (15) and the chassis (16) are pivotable relative to the supporting frame (11) for transferring the harvesting apparatus between a first position and a second position; and an actuator (28) for the pivoting movement of the chassis (16) relative to the supporting frame (11) engages at one end on the supporting frame (11) and at the other end on the chassis (16).

12. The harvesting apparatus according to claim 11, characterized in that the actuator (28) engages in the region of a longitudinal center axis of the longitudinal member (12) of the supporting frame (11) at one end on the longitudinal member (12) of the supporting frame (11) and at the other end on the chassis (16).

\* \* \* \* \*